June 12, 1973 D. T. AYERS, JR Re. 27,667

TRAILER SAFETY BRAKE CONSTRUCTION

Original Filed Nov. 27, 1967 2 Sheets-Sheet 1

INVENTOR.
David T. Ayers, Jr.
BY
Harness, Dickey & Pierce
ATTORNEYS.

TRAILER SAFETY BRAKE CONSTRUCTION

Original Filed Nov. 27, 1967 2 Sheets-Sheet 2

INVENTOR.
David T. Ayers, Jr.
BY
Harness, Dickey & Pierce
ATTORNEYS

United States Patent Office

Re. 27,667
Reissued June 12, 1973

27,667
TRAILER SAFETY BRAKE CONSTRUCTION

David T. Ayers, Jr., Birmingham, Mich., assignor to Kelsey-Hayes Company

Original No. 3,507,541, dated Apr. 21, 1970, Ser. No. 685,794, Nov. 27, 1967. Application for reissue Sept. 14, 1970, Ser. No. 72,176
Int. Cl. B60t *13/70*
U.S. Cl. 303—7 12 Claims

Matter enclosed in heavy brackets [ ] appears in the original patent but forms no part of this reissue specification; matter printed in italics indicates the additions made by reissue.

ABSTRACT OF THE DISCLOSURE

A trailer safety brake construction for association with a towing vehicle having a primary brake system. The trailer safety brake construction includes a brake arrangement for the towed vehicle that is operative either selectively at the driver's direction, automatically upon application of the towing vehicle brakes or automatically in response to actuation of the brake pedal of the towing vehicle and failure of the brakes of the towing vehicle.

BACKGROUND OF THE INVENTION

The invention relates to a trailer safety brake construction and more particularly to a vehicle brake arrangement wherein an auxiliary set of brakes is actuated in response to failure of one of the vehicle brakes.

It should be readily apparent that failure of one or all of the brakes of a vehicle braking system will result in a considerable decrease or complete loss of braking power. Although safety or backup braking systems have been proposed, such systems normally rely upon the operation of the same brake shoes as those operated by the primary actuating system. For example, braking systems have been employed in which the brake shoes are hydraulically operated and in which mechanical operation of the shoes occurs in the event of hydraulic failure. This type of system is not completely satisfactory since the failure may occur in the brake shoe itself thus rendering the backup or safety system inoperative at the same time the main actuating system fails. In addition, the previously proposed systems of this type have been complex, greatly adding to the cost of the braking system.

It is, therefore, a principal object of this invention to provide an improved, safety braking system.

It is a further object of the invention to provide a safety braking system embodying auxiliary brakes that are actuated in response to the failure of the main braking system.

In order to minimize the hazard of brake failure, it has been proposed to embody separate master cylinders for the front and rear hydraulic brakes of a motor vehicle. In addition, such braking systems recently have incorporated a visual warning, in the form of an indicator light, to indicate to the operator when a failure of one of the braking systems occurs. Such systems, however, provide no mechanism for compensating for the resultant loss of braking power.

It is, therefore, another object of this invention to provide an auxiliary safety brake system that is operative in response to an indication of failure of one of the primary braking systems.

Frequently motor vehicles are used to tow trailers. In order to compensate for the additional load of the trailer, such trailers oftentimes incorporate their own braking systems that are operated either selectively by the operator, in response to operation of the towing vehicle brakes or a combination of both. When a trailer is being towed, a loss in braking power due to the failure of the brakes of the towing vehicle is particularly dangerous. It is, therefore, still another object of this invention to provide a safety braking system for a trailer.

It is a yet further object of this invention to provide a safety brake arrangement for a trailer that will operate upon actuation of the towing vehicle brake operator and upon a failure of the towing vehicle brakes.

SUMMARY OF THE INVENTION

A safety braking system embodying this invention is particularly adapted for use in motor vehicles. The safety braking system comprises a first brake and a second brake. Actuating means are provided for selectively actuating the first brake. The safety system is completed by means responsive to the failure of the first brake to operate upon actuation of the actuating means for operating the second brake.

The safety braking system described in the immediately preceding paragraph has particular application in the braking system of a trailer having a brake and which trailer is drawn by a towing vehicle having a primary brake system comprised of at least one vehicle wheel brake and actuating means for the vehicle wheel brake. In this embodiment, means responsive to the operation of the actuating means and the failure of the vehicle wheel brake effect operation of the trailer brake.

DETAILED DESCRIPTION OF THE PREFERRED EMBODIMENT

Figure 1:
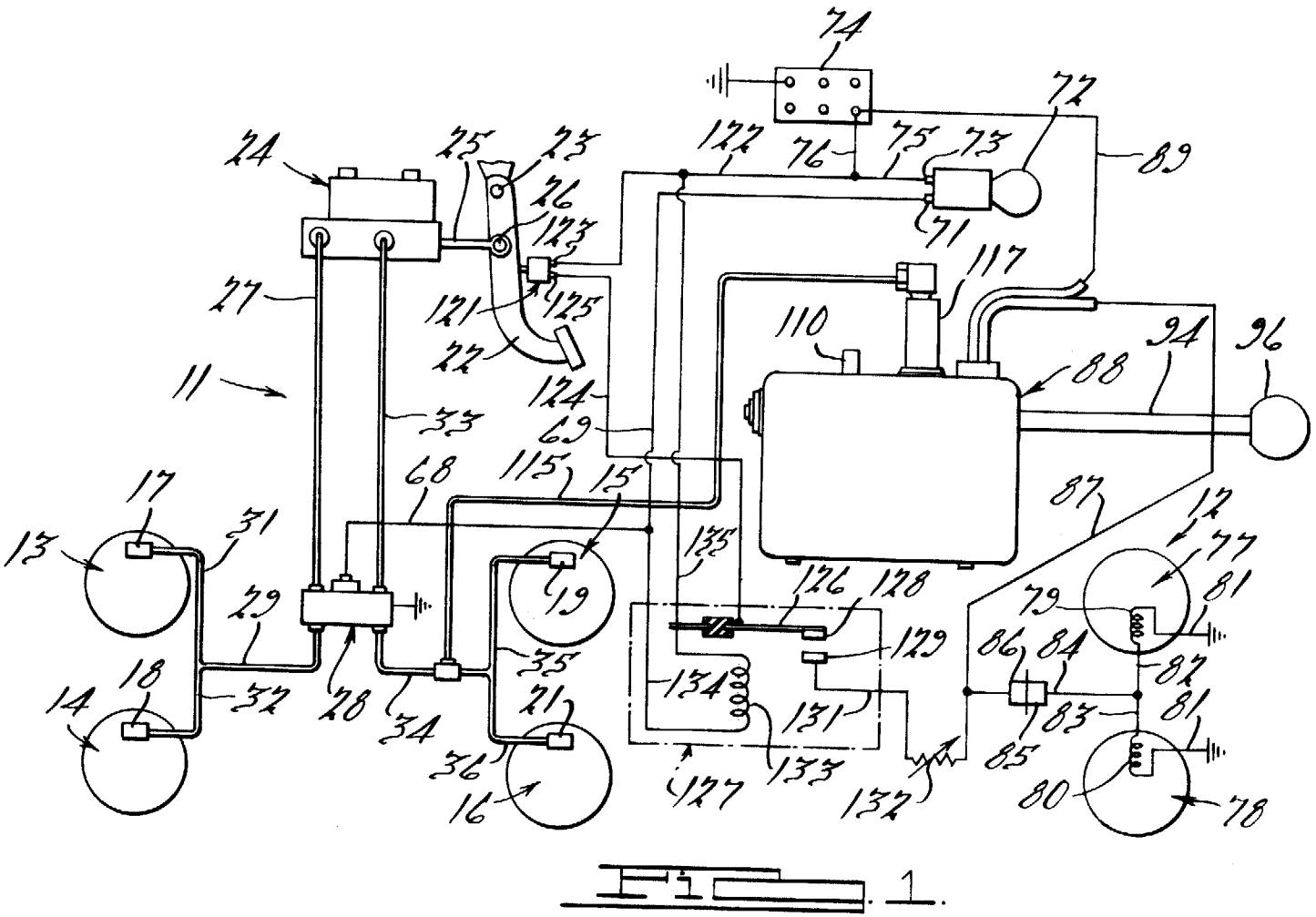
FIGURE 1 is a schematic view of a vehicle safety brake system embodying this invention.

FIGURE 1 schematically illustrates a braking system for a motor vehicle and towed trailer, the towing vehicle brake system being identified generally by the reference numeral 11 and the trailer brake system being identified generally by the reference numeral 12. The towing vehicle brake system 11 is comprised of a pair of front wheel brakes 13 and 14 and a pair of rear wheel brakes 15 and 16. The brakes 13, 14, 15 and 16 are depicted as being of the hydraulically operated type and include wheel cylinders 17, 18, 19 and 21, respectively. The actual construction of the brakes 13, 14, 15 and 16 is not shown in any detail since it forms no part of the invention. It is to be understood, however, that the brakes may be of the internal shoe type, the disk type, or any other known combination of types, such as front disk type and rear drum type.

The main vehicle wheel brakes 13, 14, 15 and 16 are operated by means of the brake pedal 22 that is pivotally supported, as at 23, in any known manner within the driver's compartment of the associated vehicle. The brake pedal 22 operates a master cylinder assembly 24 by means of an actuating rod 25 that is connected to the brake pedal 22, as at 26, and which operates the pistons of the master cylinder assembly 24. In the depicted embodiment, the master cylinder assembly 24 is of the dual cylinder type. That is, a separate master cylinder portion, each having its own piston, is provided for actuating the front pair of brakes 13 and 14 and rear brakes 15 and 16. To this end, a front hydraulic conduit 27 extends from the front master cylinder portion of the master cylinder assembly 24 to a failure indicating device, indicated generally by the reference numeral 28 and to be described in more detail as this description proceeds. The conduit 27 discharges into a conduit 29 via the failure indicating device 28. The conduit 28 terminates in branch conduits 31 and 32 which deliver fluid under pressure to the wheel cylinders 17 and 18, respectively. A rear pressure conduit 33 extends from the rear wheel cylinder portion of the master cylinder assembly 24 to the failure indicating device 28 and thence to a rear brake pressure conduit 34. The conduit 34 terminates in branch conduits 35 and 36 that extend to the rear wheel cylinders 19 and 21, respectively.

Figure 3:
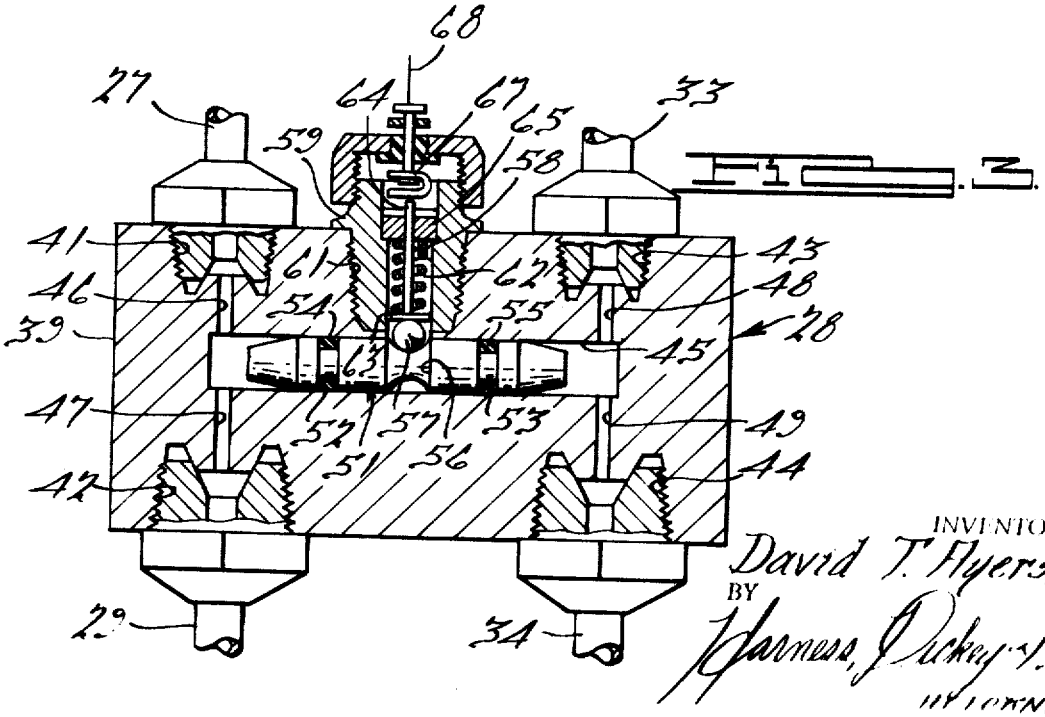
FIGURE 3 is an enlarged cross-sectional view of a device for indicating a failure of the primary brakes of the towing vehicle incorporated in the system shown in FIGURE 1.

Referring now to FIGURE 3, the failure indicating device 28 will be described in detail. The device 28 is comprised of a body member 39 having tapped openings 41, 42, 43 and 44 into which appropriate fittings at the ends of the conduits 27, 29, 33 and 34, respectively, are threaded. An enlarged, transversely extending cylindrical bore 45 is formed in the body member 39 which bore is closed at each of its ends. One end of the bore 45 is intersected by a passage 46 that extends through the body member 39 from the tapped opening 41. A like passage 47 intersects the bore 45 diametrically opposite the passage 46 and terminates the tapped opening 42. At the opposite end of the body member 39, a fluid passage 48 extends from the tapped opening 43 to the bore 45. Diametrically opposite the passage 48 a passage 49 extends from the bore 45 to the tapped opening 44. It should be readily apparent that the passages 46 and 47 and bore 45 provide for direct fluid communication between the front wheel brake conduits 27 and 29. In a like manner, the passages 48 and 49 and the bore 45 provide direct fluid communication between the rear wheel brake conduits 33 and 34. Thus, the failure indicating device 28 does not affect the operation of the towing vehicle brakes.

A sliding piston 51 is supported within the bore 45. The piston 51 is formed with circumferential grooves 52 and 53 in which O-ring seals 54 and 55, respectively, are received to preclude any substantial fluid leakage past the piston 51 without interfering with the sliding movement of the piston 51. Between the grooves 52 and 53 the piston 51 is formed with a circumferential groove 56. A ball 57 is seated in the groove 56 when the piston 51 is in a neutral position as shown in this figure. The ball 57 is positioned in part within a bore 58 of a fitting 59 that is threaded into a tapped hole 61 in the housing member 39 adjacent the piston groove 56. A coil spring 62 is received in the bore 58 and engages an enlarged head 63 of a plunger rod 64. The opposite end of the spring 62 bears against a stop member 65 to hold the ball 57 in engagement with the groove 56. The upper end of the rod 64 is adapted to contact a terminal 67 that is connected by a conductor 68 (FIGURE 1) and by a conductor 69 to one terminal 71 of an indicator light 72 positioned upon the dash of the operator's compartment. Another terminal 73 of the indicator light 72 is connected to one terminal of a battery 74 by means of conductors 75 and 76. The other terminal of the battery 74 is appropriately grounded as is the housing member 39.

During normal braking operation, the master cylinder 24 will deliver fluid under substantially equal pressures to the front and rear brakes through the conduits 27 and 33. Equal pressures will be exerted, therefore, upon the opposite ends of the piston 51 and it will maintain its neutral position. In this position, the rod 64 will not contact the terminal 67 and an open circuit will exist whereby the indicator light 72 will not be illuminated. Should either the front brakes 17 or 18 or the rear brakes 19 or 21 malfunction due to a hydraulic failure, the piston 51 will be shifted either to the right or to the left. When this occurs, the ball 57 will be cammed upwardly bringing the plunger rod 64 into contact with the terminal 67. The circuit to the indicator light 72 will then be completed causing the indicator light 72 to become illuminated. Thus, a visual warning of a brake malfunction of the towing vehicle will be given to the vehicle operator. Upon correction of the defect, the piston 51 will be returned to its neutral position by the hydraulic pressure generated by the bleeding operation of the front and rear systems subsequent to the repair.

Referring now to the trailer brake system 12, it is comprised of a pair of brakes 77 and 78 associated with the wheels of the trailer towed by the motor vehicle. The brakes 77 and 78 may be of any known type and are electrically actuated by means of solenoids 79 and 80, respectively, or any other known electrical motors. One side of the solenoids 79 and 80 are grounded by means of conductors 81. Conductors 82 and 83 extend from the other side of the solenoids 79 and 80 to a common conductor 84 that terminates at a snap connector 85. The snap connector 85 is adapted to be connected to a cooperating snap connector 86 provided at one end of a conductor 87. The conductor 87 extends to a control assembly 88, which is adapted to be positioned in the driver's compartment and which selectively connects the conductor 87 in circuit to the battery 74 by means of a conductor 89, as will become more apparent as this description proceeds.

Figure 2:
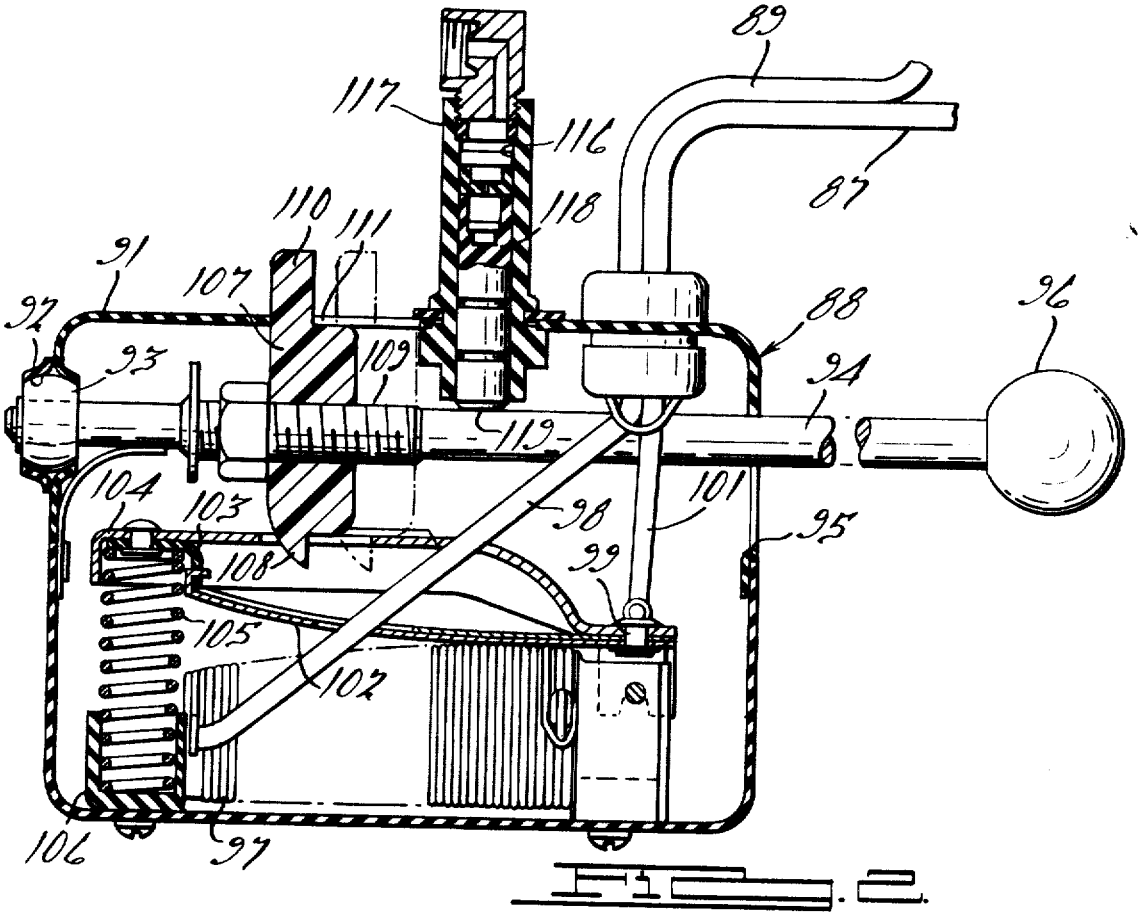
FIGURE 2 is an enlarged, cross-sectional view of a portion of the trailer brake operating mechanism shown in FIGURE 1.

Referring now to FIGURE 2, the controller 88 provides for selective operator control actuation of the trailer brakes 77 and 78 or causes the trailer brakes 77 and 78 to be operated simultaneously with the operation of the towing vehicle brakes 13 through 16. The controller 88 is of the general type shown in United States Letters Patent 2,829,225, entitled "Electric Controller" issued in the name of Elmer R. Ross on Apr. 1, 1958 and assigned to the assignee of this invention. The controller 88 is comprised of a generally rectangular housing 91 that defines a socket 92 in which an enlarged, generally spherical end 93 of a control lever 94 is pivotally and rotatably supported. The control lever 94 extends through a rectangular aperture 95 formed in the opposite side wall of the housing 91 and has a control knob 96 fixed to its outer end. The exposed portion of the control lever 94 and control knob 96 are appropriately positioned within the driver's compartment so as to be readily accessible to the driver of the vehicle.

A rheostate comprised of a wound resistance coil 97 is positioned at the lower end of the housing 91. One end of the resistance coil 97 is connected in circuit with a conductor 98 which, in turn, is in circuit with the conductor 89. The turns of the resistance coil 97 are adapted to be contacted by a spring like contact arm 102, one end of which is connected to the conductor 87 by a terminal 99 and conductor 101. The contact arm 102 normally curves upwardly away from contact with the outer periphery of the resistor coil 97. The outer end of the contact arm 102 is connected by means of an insulated member 103 to one end of a resilient operating arm 104. A coil compression spring 105 engages the underside of the arm 104 at one of its ends and is held in a generally cup-shaped insulator 106 at its other end. The spring 105 normally urges the operating arm 104 and contact arm 102 upwardly so that the contact arm 102 will not contact the resistor coils 97. Hence, in this position no current will be conducted from the conductor 98 to the conductor 101.

An operating member 107 has a depending projection 108 that extends through an elongated slot in the operating arm 104. The operating member 107 is, therefore, fixed against rotation but is free to move axially along the lever 94 by means of a screw and nut connection, indicated generally by the reference numeral 109, between these elements. The operating member 108 also has an upwardly extending projection 110 that extends through an elongated slot 111 in the housing 91 so as to provide a visual indication of the axial location of the member 108 on the control lever 94.

If the operator control of the trailer brakes 77 and 78 is desired, the control lever 94 is depressed about the pivot point defined by the housing socket 92. Downward movement of the lever 94 will cause the operating arm 104 and contact arm 102 to deflect shorting out a progressively increasing number of turns of the resistor 97 and providing an electrical connection between the conductor 98 and conductor 101 through the resistance coil 97. Hence, the brakes 77 and 78 will be energized in response to downward movement of the lever 94, the exact force exerted by the brakes being dependent upon the degree of depression of the lever 94. The maximum overall effect may be adjusted by changing the axial position of the member 107 on the lever 94 through rotation of the lever. The spring 105, in addition to effecting release of the brakes upon release of the lever 94, will give some feel to the operator.

The controller 88 also provides for actuation of the trailer brakes 77 and 78 upon operation of the vehicle brakes 13 through 16 by the brake pedal 22 in a manner now to be described. A pressure conduit 115 extends from a T connection in the brake conduit 34 to a cylindrical bore 116 formed in a generally cylindrical housing member 117 that is supported in the controller housing 91. A piston 118 is supported for reciprocation within the bore 116 and has a lower contact end 119 that engages the lever 94. Actuation of the vehicle brakes 13, 14, 15 and 16 by the master cylinder 24 will pressurize the bore 116 driving the piston 118 downwardly. Thus, hydraulic actuation of the lever 94 is effected with attendant actuation of the trailer brakes 77 and 78. The amount of torque developed by the brakes 77 and 78 under these circumstances will be proportional to the amount of force exerted by the vehicle rear wheel brakes 15 and 16. Again, the spring 105 will act to release the trailer brakes 77 and 78.

A mechanism, now to be described, is provided for actuating the trailer brakes 77 and 78 when the brake pedal 22 is depressed and in the event of a failure of one of the pairs of the brakes of the towing vehicle. This safety device includes a towing vehicle brake light switch 121 (FIGURE 1) that is associated with the brake pedal 22 and which actuates the towing vehicle brake lights through a known type of circuit when the brake pedal 22 is depressed. The safety actuation circuit includes a conductor 122 that extends from one terminal 123 of the brake light switch 121 to one terminal of the battery 74 via the conductor 76. A conductor 124 extends from the other terminal 125 of the brake light switch 121 to a contact arm 126 of a safety control unit 127. The contact arm 126 carries a contact point 128 at its outer end which is normally spaced from a contact point 129. The contact point 129 is connected to a conductor 131 which is in series circuit with a variable resistor 132 and the connector 86. Thus, there is a circuit from the battery 74 to the trailer brake solenoids 79 and 80 through the brake light switch 121 and the switch established by the contact points 128 and 129.

The contact arm 126 is operated by a relay coil 133 that is in circuit with the conductor 68 of the brake failure indicator device 28 by means of a conductor 134 and with one of the battery terminals by means of a conductor 135. Hence, when the device 28 indicates a malfunction, the relay coil 133 will be energized drawing the contact points 128 and 129 into engagement thus establishing a circuit to the trailer brake solenoids 79 and 80. This circuit is completed by closure of the stop light switch 121 due to the depression of the brake pedal 22 and the trailer brakes will be energized. The maximum force exerted by the trailer brakes 77 and 78 under these circumstances may be appropriately adjusted by varying the setting of the variable resistor 132. Alternatively, this variable resistor 132 may be omitted.

It should be readily apparent that the disclosed system provides for manual or automatic operation of the trailer brakes and further provides the safety features that the trailer brakes will be operated automatically if one of the primary brake systems of the towing vehicle fails. The device 28 indicates a failure of only one of the two primary brake systems. It should be readily apparent that the trailer brake system may be operated in response to a failure of either or both of the primary brake systems through the use of an appropriate pressure sensing device.

What is claimed is:

[1. In a brake system for a trailer having a brake and drawn by a towing vehicle having a primary brake system comprising a plurality of vehicle wheel brakes and actuating means for the vehicle wheel brakes, the improvement comprising means responsive to the failure of at least one of the vehicle wheel brakes to operate upon actuation of the actuating means for operating the trailer brake.]

2. A brake system as set forth in claim 1 further including second actuating means adapted to be positioned within the towing vehicle for selective actuation of the trailer brake.

3. A brake system as set forth in claim 2 further including means for operatively connecting the first mentioned actuating means to the second actuating means for actuating the trailer brake simultaneous with actuation of the vehicle wheel brake.

4. A brake system as set forth in claim 1 further including a warning light and means for illuminating said warning light upon a failure of the vehicle wheel brake to operate upon actuation of the actuating means, the last named means being operative in response to the means for illuminating said warning light.

5. A brake system as set forth in claim 1 wherein the primary brake system of the towing vehicle further includes brake light means for indicating operation of the actuating means of the vehicle wheel brake, the last named means comprising means including electric means in circuit with said brake light means.

6. For use in a trailer brake system of a trailer towed by a towing vehicle having vehicle wheel brakes, actuating means for actuating the vehicle wheel brakes, a stop light switch responsive to actuation of the actuating means, and warning light means for indicating a failure of the vehicle wheel brakes to operate, said trailer brake system comprising at least one wheel brake, and means for actuating said trailer wheel brake upon actuation of the stop light switch of the towing vehicle and simultaneous indication of a brake failure of the towing vehicle brakes by the warning light means.

7. A brake system as set forth in claim 6 wherein the towing vehicle has a pair of front wheel brakes and a pair of rear wheel brakes, the warning light means being operative in response to failure of one of the pairs of vehicle wheel brakes to operate.

8. A brake system as set forth in claim 7 wherein the wheel brake of the trailer brake system includes electric motor means for actuating said wheel brake, said electric motor means being in circuit with the vehicle stop light switch and warning light means.

9. A brake system as set forth in claim 8 further including variable resistor means in circuit with the electric motor means for limiting the maximum force exerted by the electric motor means.

10. A brake system as set forth in claim 9 further including means for selectively actuating the trailer wheel brake.

11. A brake system for a vehicle or the like comprising a first wheel brake, a second wheel brake, first actuating means for selectively actuating said first wheel brake, second actuating means for selectively actuating said second wheel brake, means for simultaneously actuating said second actuating means upon actuation on said first actuating means for simultaneously actuating said first wheel brake and said second wheel brake upon actuation of said first actuating means, and means responsive to a failure of said first wheel brake to operate upon the actuation of said first actuating means for actuating said second wheel brake.

12. A brake system for a vehicle or the like comprising a first brake, a second brake, means for simultaneously actuating said first brake and said second brake including a dual master cylinder and means for hydraulically connecting each cylinder portion of said dual master cylinder to a respective one of said first and said second brakes, a third brake, and means responsive to a failure of either said first brake or said second brake to operate upon actuation of said actuating means for operating said third brake.

*13. In an automotive brake system for a towing vehicle having a primary brake system comprising a plurality of frictional vehicle wheel brakes and actuating means for the frictional vehicle wheel brakes, and a trailer having a brake and drawn by the towing vehicle, the improvement comprising means responsive to the failure of at least one of the frictional vehicle wheel brakes of the towing vehicle to operate upon actuation of the actuating means for operating the trailer brake to exert a braking force on the towing vehicle.*

References Cited

The following references, cited by the Examiner, are of record in the patented file of this patent or the original patent.

UNITED STATES PATENTS

| | | | |
|---|---|---|---|
| 2,720,293 | 10/1955 | Brinkmeyer | 188—106 |
| 3,582,150 | 6/1971 | Williams et al. | 188—106 P |
| 3,114,580 | 12/1963 | McDuff | 303—2 |
| 3,228,194 | 1/1966 | Blair | 303—84 X |
| 3,232,674 | 2/1966 | Stelzer | 303—7 |
| 3,333,902 | 8/1967 | Liverance et al. | 303—2 |
| 3,350,142 | 10/1967 | Schuman | 303—20 X |

FOREIGN PATENTS

| | | | |
|---|---|---|---|
| 253,136 | 3/1927 | Great Britain | 303—3 |

MILTON BUCHLER, Primary Examiner
J. J. McLAUGHLIN, Assistant Examiner

U.S. Cl. X.R.
303—3, 13, 15, 20, 84 A

UNITED STATES PATENT OFFICE
CERTIFICATE OF CORRECTION

Patent No. Re. 27,667 Dated June 12, 1973

Inventor(s) D. T. Ayers, Jr.

It is certified that error appears in the above-identified patent and that said Letters Patent are hereby corrected as shown below:

Please substitute Claim 1 in the following form for Claim 1 as it appears in the printed patent:

1. In [a] an automotive brake system for [a trailer having a brake and drawn by] a towing vehicle having a primary brake system comprising a plurality of frictional vehicle wheel brakes and actuating means for the frictional vehicle wheel brakes and a trailer having a brake and drawn by the towing vehicle, the improvement comprising means responsive to the failure of at least one of the frictional vehicle wheel brakes of the towing vehicle to operate upon actuation of the actuating means for operating the trailer brake to exert a braking force on the towing vehicle.

Please delete Claim 13.

Signed and sealed this 29th day of October 1974.

(SEAL)
Attest:

McCOY M. GIBSON JR.
Attesting Officer

C. MARSHALL DANN
Commissioner of Patents